United States Patent [19]

Takahashi

[11] Patent Number: 5,506,718
[45] Date of Patent: Apr. 9, 1996

[54] SCANNING OPTICAL APPARATUS

[75] Inventor: Takashi Takahashi, Tokyo, Japan

[73] Assignee: Kabushiki Kaisha Topcon, Japan

[21] Appl. No.: 96,176

[22] Filed: Jul. 23, 1993

[30] Foreign Application Priority Data

Jul. 23, 1992 [JP] Japan ..................... 4-216554

[51] Int. Cl.$^6$ ................................. G02B 26/08
[52] U.S. Cl. ........................... 359/205; 359/216
[58] Field of Search ..................... 249/205, 512, 249/820, 489, 301, 304, 642, 647, 656, 661–664, 668, 708–712, 718, 206, 207, 507, 215–219, 212, 298; 427/164, 393.5; 347/137, 258–261; 358/296, 474, 494

[56] References Cited

U.S. PATENT DOCUMENTS

| | | | |
|---|---|---|---|
| 3,850,726 | 11/1974 | Smith et al. | 427/393.5 |
| 4,523,801 | 6/1985 | Baba et al. | 359/217 |
| 4,944,962 | 7/1990 | Furuta et al. | 427/164 |
| 5,126,873 | 6/1992 | Ang | 359/217 |

FOREIGN PATENT DOCUMENTS 1100510  4/1989  Japan .

OTHER PUBLICATIONS

Patent Abstracts of Japan, vol. 12, No. 60 (E–584) 23 Feb. 1988.
Patent Abstracts of Japan, vol. 7, No. 48 (P–178) 24 Feb. 1983.
Patent Abstracts of Japan, vol. 13, No. 274 (M–841) 23 Jun. 1989.

*Primary Examiner*—James Phan
*Attorney, Agent, or Firm*—Lorusso & Loud

[57]  ABSTRACT

A scanning optical apparatus has a source (1) of light for producing a light beam as a light flux (5) in a given direction, a polariscope (2) for polarizing the light flux (5) of the light beam in another given direction, a member or medium which is scanned by the light flux (5) of the light beam while the light flux (5) of the light beam is polarized by the polariscope (2), and a plastic lens (3) placed between the polariscope (2) and the scanned member or medium (4) for forming an image spot on the scanned member or medium (4). The plastic lens (3) has two kinds of surfaces, one of which is a polarization surface or optical surface through which the light flux (5) of the light beam passes, and the other of which is a non-polarization surface or non-optical surface through which the light flux (5) of the light beam does not pass. All of the surfaces of the plastic lens (3) have dampproofing characteristics.

5 Claims, 5 Drawing Sheets

Distribution of index of refraction caused by absorbed moisture

Distribution of index of refraction caused by absorbed moisuture

SCANNING OPTICAL APPARATUS

BACKGROUND OF THE INVENTION

The present invention relates to a scanning optical system or apparatus which has an image forming optical means including a lens system at least a part of which is made of a plastic material.

PRIOR ART

A scanning optical system comprises a source of light, a polariscope for polarizing a beam of light originated from the source of light as a light flux, a scanned member or medium which is scanned by the light beam of the light flux polarized by the polariscope, and an image forming optical means placed between the polariscope and the scanned member or medium. Lenses made of a plastic material can be employed in the image forming optical means.

A plastic lens can be manufactured at a cost much lower than that of a glass lens. In addition, plastic lenses of a special shape can also be mass-produced as well. Therefore, plastic lenses are now widely used in a scanning optical system. Acrylic is a typical material for producing a plastic lens.

However, the plastic material has the a shortcoming that it is affected by the temperature and humidity more easily than glass. With respect to humidity in particular, the plastic material has a property of absorbing moisture so that, in an environment with a high humidity, it absorbs moisture. As a result, its index of refraction varies lately due to absorbed moisture. As known, the greater the quantity of moisture absorbed, the greater the change in index of refraction.

As described above, a plastic lens has a property of absorbing moisture. The absorbed moisture largely changes its index of refraction and the shape of the lens as well. Accordingly, the image forming performance of the lens is easily affected by the humidity with. As a result, the scanning optical system has a shortcoming that its characteristic are not stable.

SUMMARY OF THE INVENTION

In view of the problems of the conventional technology described above, it is an object of the present invention to provide a scanning optical apparatus or system which employs a plastic lens with an image forming performance hardly affected by humidity.

According to the present invention, a scanning optical apparaus comprises a polariscope for polarizing a light beam originated from a source of light as a light flux, a scanned medium or member which is scanned by the light flux of the light beam polarized by the polariscope, and an image forming optical means placed between the scanned member or medium and the polariscope. The image forming optical means has at least a plastic lens. The plastic lens has at least two surfaces. One surface is an optical surface or polarization surface through which the light beam passes. The other surface is non-optical surface or non-polarization surface through which no light beam passes. Both of the two surfaces have a dampproofing character or characteristic over the entire area thereof.

BRIEF DESCRIPTION OF THE DRAWINGS

The present invention will become more apparent from the following detailed description of a preferred embodiment with reference to accompanying drawings in which.

DESCRIPTION OF THE PREFERED EMBODIMENT

Figure 1:
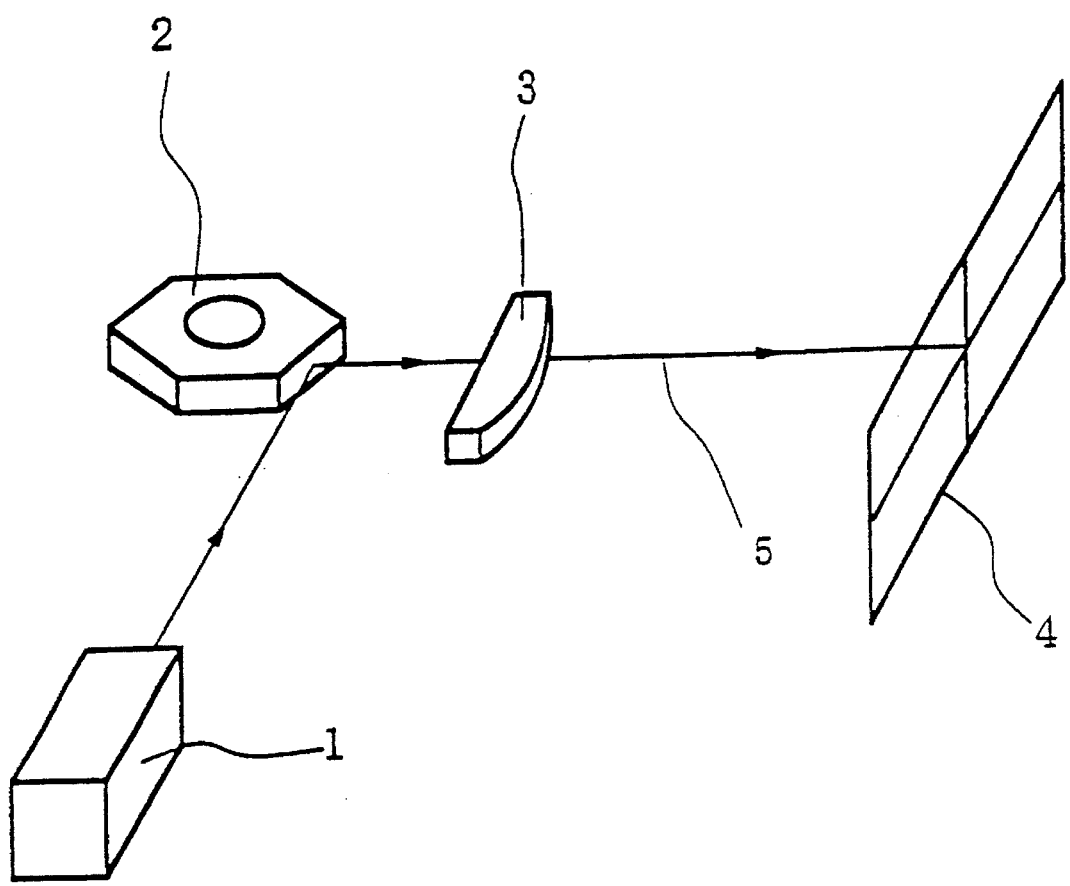
FIG. 1 is a schematic diagram showing simply a scanning optical apparatus according to a preferred embodiment of the present invention.

An example of a scanning optical apparatus according to a preferred embodiment of the present invention is shown in FIG. 1. A source 1 of light is provided in a conventional manner so as to produce a light beam in a given direction toward a polariscope 2. The light beam originating from the source 1 of light is polarized by the polariscope 2 so as to pass through a plastic lens 3 toward a medium or member 4 to be scanned as a light flux 5. The light flux 5 is polarized by the polariscope 2 and then passes through the plastic lens 3. The light beam of the light flux 5 finally forms an image forming spot on the scanned medium or member 4.

The configuration of the scanning optical apparatus allows the image forming spot to scan over the entire area of the scanned member or medium 4, accompanying the rotation of the polariscope 2.

The lens 3 constitutes a part of an image forming optical means. The image forming optical means may include a set of plural lenses comprising at least one plastic lens although not shown.

As shown conceptually in FIG. 1, the plastic lens 3 comprises two opposite polarization surfaces or optical surfaces through which the light flux 5 passes, and four non-polarizing surfaces or non-optical surfaces through which the light flux 5 does not pass. The plastic lens 3 is elongate, and the length of the plastic lens 3 in a direction parallel to the polarization surfaces is larger than its length in a direction perpendicular to the polarization surfaces.

All surfaces of the plastic lens 3 have dampproofing characteristics over the entire area thereof. The polarization or optical surfaces and the non-polarizing or non-optical surfaces thereof are subjected to a dampproofing process or treatment. In a typical dampproofing process, the entire area of all surfaces of the plastic lens 3 are coated with a solvent-soluble crystalline high-polymer material such as vinylidene chloride. Preferably, such a crystalline high-polymer material for the coating purpose that does not have any affect on the optical characteristics of the plastic lens is selected. In case the solvent-soluble crystalline high-polymer material has some affect on the optical characteristics, the affect has to be so small that no problem results. As described above, instead of the vinylidene-chloride, a copolymer of the vinylidene-chloride family can also be used as the solvable crystalline high-polymer material. These substances can be used as a shield for protecting the of the lens structure against moisture molecules.

The plastic lens 3 is subjected to a dampproofing process or treatment over the entire area of all surfaces, that is, the two polarization surfaces or optical surfaces and the four non-polarizing surfaces or non-optical surfaces thereof.

Examples to be used for comparison, which undergo a dampproofing process over a part or parts of the entire area of the surfaces of the plastic lens will be explained. For example, either the polarization surface (optical surface) or the non-polarizing surface (non-optical surface) thereof is subjected to a dampproofing treatment. The effect of the entire dampproofing process in case of the present invention will be compared to that of the partial dampproofing process in case of the comparative examples.

In FIGS. 2 to 5, the reference d designates depth from the surface of the plastic lens.

Figure 2:
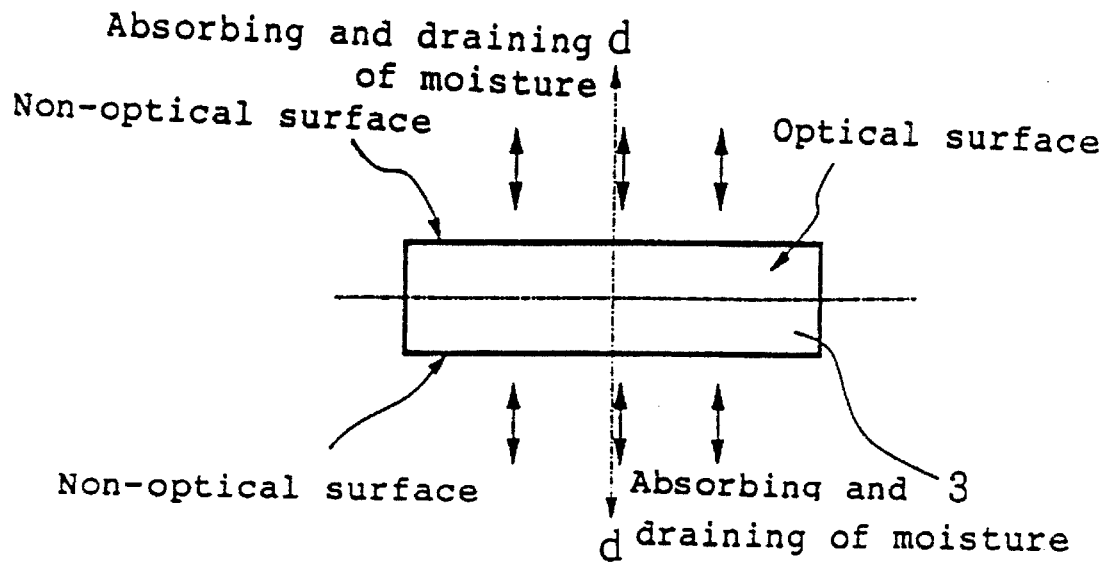
FIG. 2 shows a process of absorbing and draining moisture which occurs on a non-polarizing surface or non-optical surface perpendicular to a polarization surface or optical surface of a plastic lens.
Figure 3:
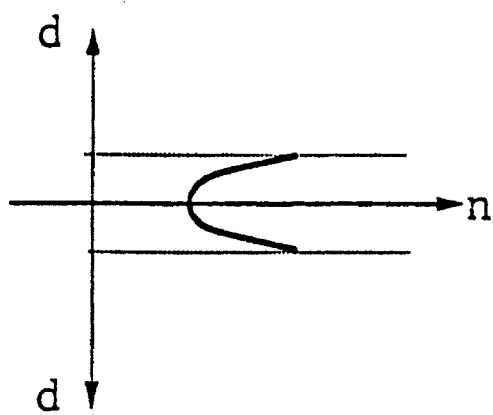
FIG. 3 shows a distribution of the index of refraction on the non-polarizing surface or non-optical surface perpendicular to the polarization surface or optical surface of the plastic lens shown in FIG. 2.

A typical result of the comparative example shown in FIG. 3 is obtained from a process shown in FIG. 2. FIG. 2 shows a state in which the non-optical surfaces of the plastic lens 3 undergo a moisture absorbing and draining process as indicated by directions of arrows. FIG. 3 shows a distribution of the index of refraction in the plastic lens 3 the non-optical surfaces of which experienced the moisture absorbing and draining process indicated in FIG. 2. The state shown in FIG. 2 are equivalent to a case in which only the polarization surfaces of the plastic lens 3 undergo a dampproofing process and then is exposed to an environment with a high humidity. In such a case, the index of refraction of the plastic lens 3 is distributed in a non-uniform manner as shown in FIG. 3 so as to depend on the depth from the non-optical surfaces of the lens. The index of refraction varies, depending upon the depth from the non-polarizing surface. As described above, the index of refraction in the plastic lens 3 has a nonuniform distribution due to absorbed moisture, affecting the beam of light that passes through the plastic lens 3 as the light flux 5. It is thus understood that, by applying the dampproofing process only to the polarization surface of the plastic lens 3, a desired effect cannot be obtained.

Figure 4:
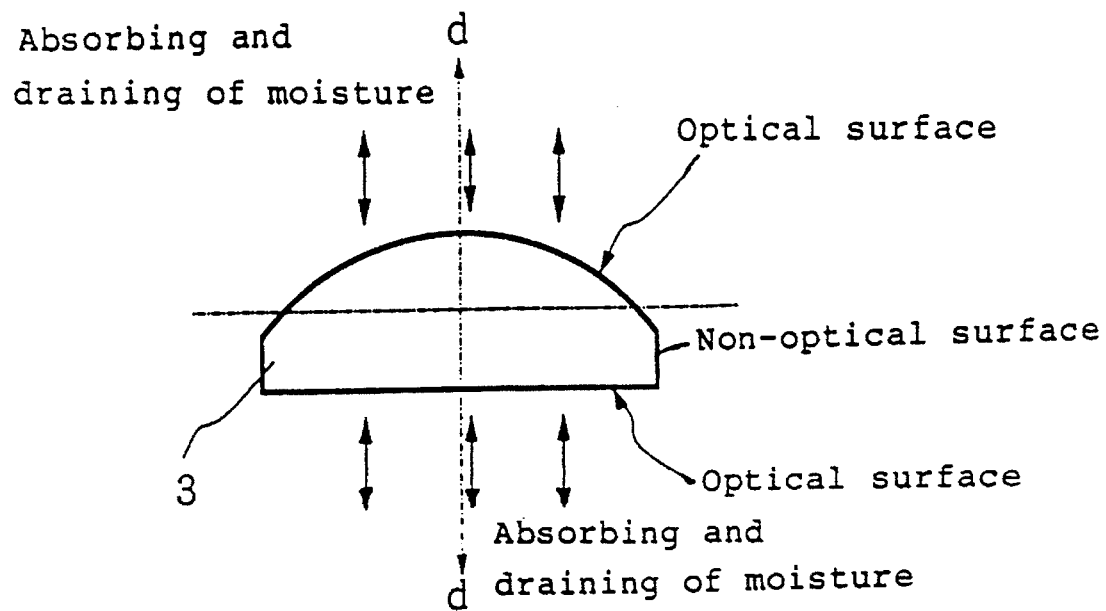
FIG. 4 shows a progress of absorbing and draining moisture which occurs on a polarization surface or optical surface of a plastic lens.
Figure 5:
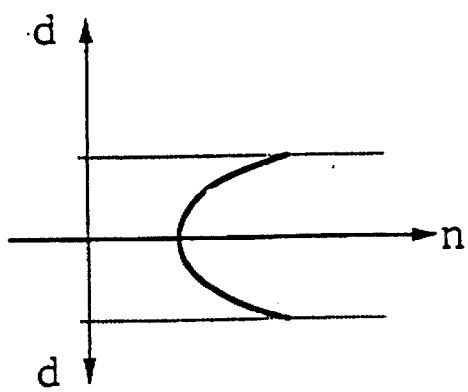
FIG. 5 shows a distribution of the index of refraction on the polarization surface or optical surface of a plastic lens shows in FIG. 4.

Another typical result of the comparative example shown in FIG. 5 is obtained from a process shown in FIG. 4. FIG. 4 shows a state in which the polarization surfaces of the plastic lens 3 undergo a moisture absorbing and draining process as indicated by directions of arrows. FIG. 5 shows a distribution of the index of refraction in the plastic lens 3, the surface of polarization of which experienced the moisture absorbing and draining process indicated in FIG. 4. The state indicated in FIG. 4 is equivalent to a case in which only the non-polarizing surface of the plastic lens 3 undergoes a dampproofing process and then is exposed to an environment with a high humidity. Also in such a case, the index of refraction of the plastic lens 3 is distributed nonuniformly as shown in FIG. 5. As shown in the FIGURE, the index of refraction varies, depending upon the depth from the surface of the surface of polarization. As described above, the index of refraction of the plastic lens 3 has a nonuniform distribution due to absorbed moisture, affecting the beam of light that passes through the plastic lens 3. It is thus understood that, by applying the dampproofing process only to the non-polarizing surface of the plastic lens 3, a desired effect cannot be obtained.

As described above, if only either the non-polarizing surface or the polarization surface of the plastic lens 3 undergoes the dampproofing process, the desired effect cannot be obtained.

On the other hand, if both the non-polarizing surface and the polarization surface of the plastic lens 3 do not experience the moisture absorbing and draining process, the index of refraction of the plastic lens 3 becomes uniform. The state of the plastic lens 3 with both the non-polarizing surface and the polarization surface of the plastic lens 3 experiencing no moisture absorbing and draining process is equivalent to the case of exposing the plastic lens 3 after both the non-polarizing surface and the polarization surface of the plastic lens 3 have undergone a dampproofing process.

Next, experiments will be explained in which two plastic lenses undergoing no dampproofing process and five plastic lenses experiencing a dampproofing process on the entire areas of both the polarization surfaces and the non-polarizing surfaces thereof were exposed to an environment with a high humidity. Note that the two plastic lenses and the five plastic lenses are all of the same type as shown in FIG. 1. After the exposure to the high-humidity environment, variations in spot sizes were observed. Both experiments were carried out under all the same conditions except the time of exposure to the high-humidity environment and the initial spot sizes. Results of experiments without and with the dampproofing process are shown in FIGS. 6 and 7 respectively.

Figure 6:
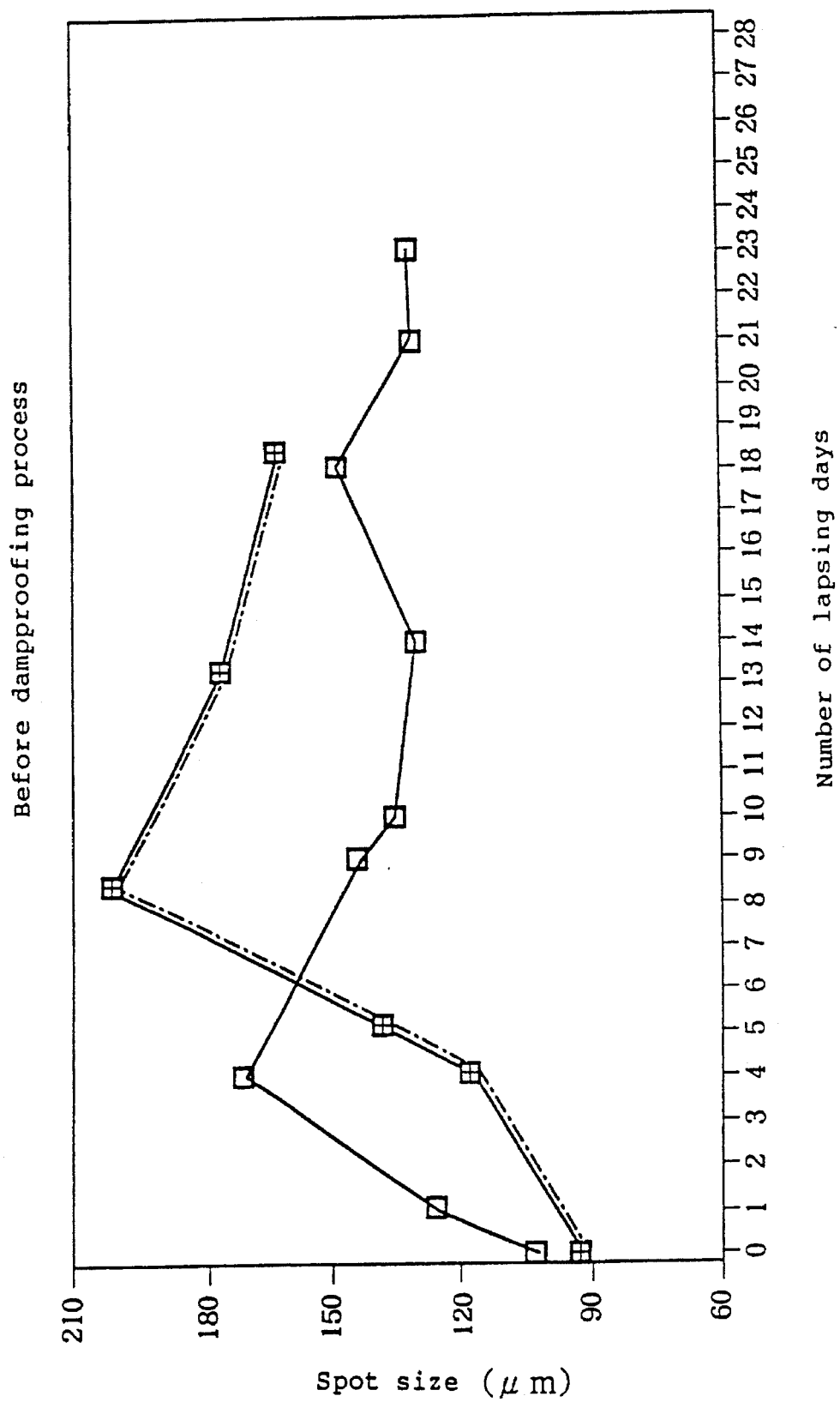
FIG. 6 shows day-to-day changes in spot size of a plastic lens not subjected to a dampproofing process.

It is observed from FIG. 6 that a plastic lens undergoing no dampproofing process exhibits large variations in spot size even before 20 days have lapsed since the start of the exposure to the environment with a high humidity.

Figure 7:
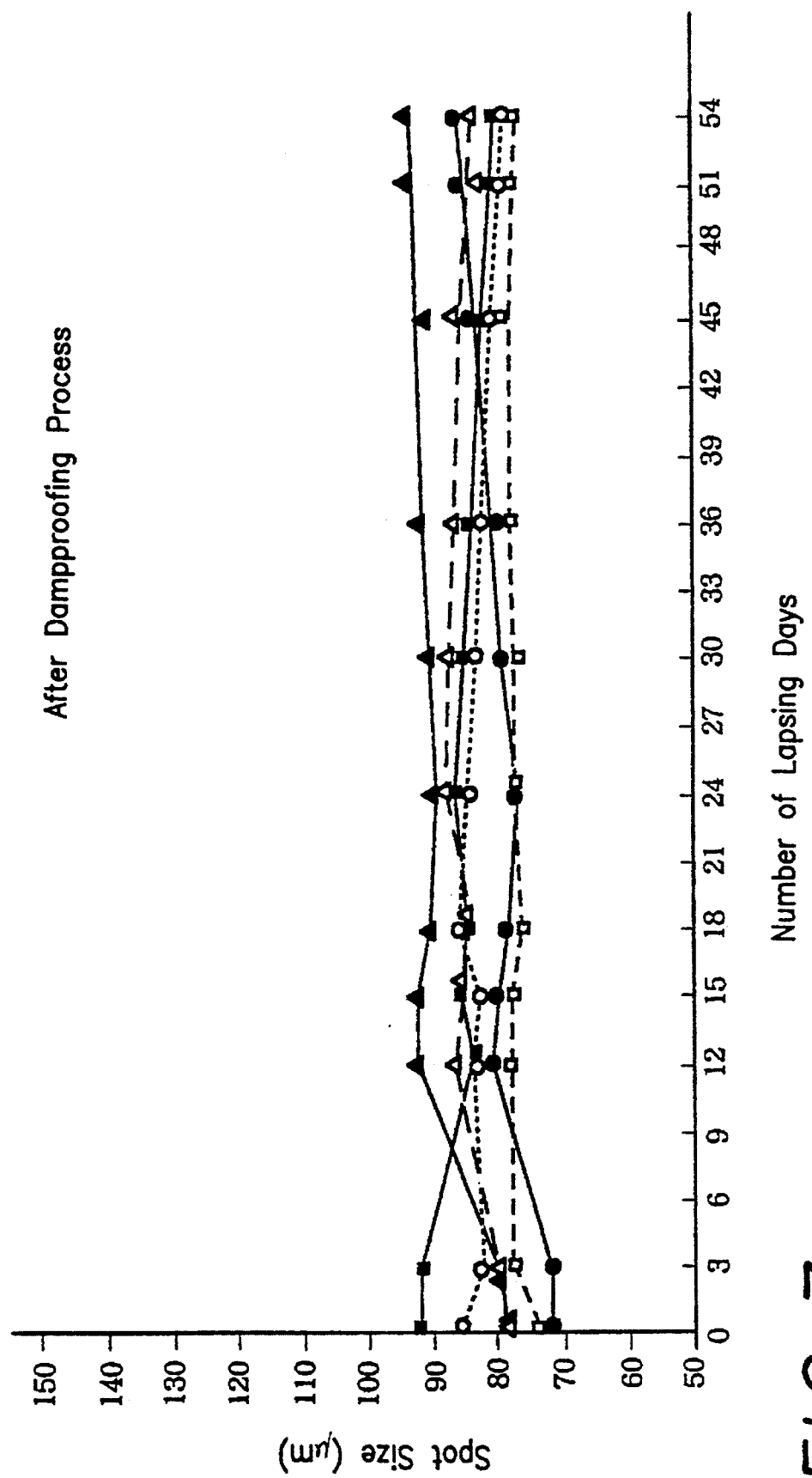
FIG. 7 shows day-to-day changes in spot size of a plastic lense experiencing or subjected to a dampproofing process.

On the other hand, it is observed from FIG. 7 that a plastic lens experiencing a dampproofing process on the entire area of both the polarization surface and the non-polarizing surface thereof exhibits a stable spot size even after 50 days have lapsed since the start of the exposure to the environment with a high humidity.

In a scanning optical apparatus according to the present invention, a plastic lens employed in an image forming optical means has dampproofing characteristics on the entire area of both the polarization surfaces and the non-polarizing surfaces thereof to give stable image forming characteristics not effected by humidity over a long period of time.

What is claimed is:

1. A scanning optical apparatus, comprising:

a source of light for originating a light beam as a light flux;

a polariscope for polarizing the light beam originated from said source of light;

a scanned member which is scanned by the light flux of the light beam polarized by said polariscope; and an image forming optical means placed between said scanned member and said polariscope, said image forming optical means including a plastic lens having a first surface functioning as a polarization surface or optical surface and a second surface functioning as a non-polarization surface or non-optical surface, both said first surface and said second surface being substantially entirely coated with a crystalline high-polymer material which is vinylidene chloride or a vinylidene chloride copolymer.

2. A scanning optical apparatus as defined in claim 1, wherein said plastic lens has a long shape in a direction which is substantially parallel to said polarization surface thereof.

3. A scanning optical apparatus comprising:

a source of light for producing a light beam as a light flux in a given direction;

a polariscope for polarizing the light flux of the light beam in another given direction;

a member or medium which is scanned by the light flux of the light beam while the light flux of the light beam is polarized by the polariscope; and a plastic lens placed between the polariscope and the scanned member or medium for forming an image spot on the scanned member or medium, the plastic lens having two kinds of surfaces one of which is a polarization surface or optical surface through which the light flux of the light beam passes and the other of which is a non-polarization surface or non-optical surface through which the light flux of the light beam does not pass, substantially the entirety of all of the surfaces of the plastic lens being coated with a crystalline high-polymer material which is vinylidene chloride or a vinylidene chloride copolymer.

4. A scanning optical apparatus as defined in claim 3 wherein the plastic lens has two opposite polarization surfaces or optical surfaces and four non-polarization surfaces or non-optical surfaces in a long shape.

5. A scanning optical apparatus as defined in claim 4, wherein the plastic lens has a long length in a direction parallel to the polarization surfaces or optical surfaces.

* * * * *

UNITED STATES PATENT AND TRADEMARK OFFICE
CERTIFICATE OF CORRECTION

PATENT NO. : 5,506,718
DATED : April 9, 1996
INVENTOR(S) : TAKAHASHI

It is certified that error appears in the above-indentified patent and that said Letters Patent is hereby corrected as shown below:

Col. 1,
    line 25, delete "a";

line 38, delete "with"; and

Col. 2, line 12, delete "progress" insert —process—.

Col. 3, line 5, delete "of the";
    line 26, after "3" insert a comma —,—;
    line 31 delete "is" insert —are—.
    line 29, delete "are" insert —is—.

Signed and Sealed this

Third Day of June, 1997

BRUCE LEHMAN

*Attest:*

*Attesting Officer*    Commissioner of Patents and Trademarks